United States Patent Office 2,816,082
Patented Dec. 10, 1957

2,816,082

PROCESS OF POLYMERIZING A FLUOROETHYLENE IN WATER CONTAINING A CHLORENDIC ACID COMPOUND

Keith Clark Brinker, Fairfax, Wilmington, Del., and Robert Macdonald Ross, Binghamton, N. Y., assignors to E. I. du Pont de Nemours and Company, Wilmington, Del., a corporation of Delaware No Drawing. Application September 14, 1955, Serial No. 534,404

10 Claims. (Cl. 260—29.6)

This invention relates to the polymerization of perhalogenated monomers to form aqueous polymer dispersions and particularly relates to the use of novel dispersing agents in the said polymerizations. This application is a continuation-in-part of applicants' application Serial Number 470,122, filed November 19, 1954, now abandoned.

The polymerization of fluoroethylenes, such as tetrafluoroethylene to form aqueous colloidal dispersions, has been carried out by polymerizing tetrafluoroethylene in aqueous media in the presence of organic peroxides as disclosed in U. S. Patent 2,534,058 issued to Malcolm M. Renfrew, December 12, 1950. A serious disadvantage of this procedure, particularly in those cases where no dispersing agent is added, is that the colloid is unstable and is coagulated at very low polymer concentrations by the agitation necessary to dissolve the gaseous tetrafluoroethylene monomer in the aqueous reaction medium. The result is that the desired colloidal polymer is obtained in a state of high dilution in the aqueous medium necessitating the handling of large amounts of water for a given amount of polymer. Concentrated dispersions of polytetrafluoroethylene, however, have been obtained by polymerizing tetrafluoroethylene in an aqueous reaction medium in the presence of perfluoroalkanoic acids or their salts as described in U. S. Patent 2,559,752, issued to Kenneth L. Berry, July 10, 1951. This process of obtaining concentrated dispersions of colloidal polytetrafluoroethylene is improved if small quantities of iron are added to the aqueous reaction medium as described in patent application of Adam E. Kroll, Serial No. 354,652, filed May 12, 1953, now U. S. Patent 2,750,350. However, the most effective dispersing agents used in these prior art processes of preparing aqueous dispersions of polytetrafluoroethylene are not readily available; they are prepared by extremely difficult chemical reactions and are therefore expensive.

It is, therefore, the objective of the present invention to provide an improved process for preparing aqueous colloidal dispersions of fluoroethylene polymers. A further object is to provide a process which is more economical than those heretofore known. Still another object of this invention is the application of a novel dispersing agent in the polymerization of fluoroethylenes to form aqueous polymer dispersions. Other objects will become apparent from the description of the invention hereinabove.

The above objects of the present invention are accomplished by polymerizing fluoroethylenes in an aqueous medium in the presence of a water-soluble initiator, a quantity not exceeding 1% by weight of said aqueous medium of 1,4,5,6,7,7,-hexachlorobicyclo(2,2,1)-5-heptene 2,3,-dicarboxylic acid or a salt thereof as the dispersing agent, and preferably a quantity of 1 to 5% by weight of said aqueous medium of an insoluble saturated hydrocarbon compound liquid at polymerization temperatures. The insoluble hydrocarbon is added as an anti-coagulant when it is desirable to prepare highly concentrated aqueous dispersions of polymer.

It has now been found, surprisingly so, that this particular compound which has the following structural formula

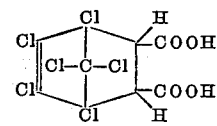

and is also known as chlorendic acid, which name will be used hereinafter to designate said compound, acts as a dispersing agent in the aqueous polymerization of fluorocarbon monomers. This dispersing agent is successfully used in the preparation of high molecular weight polytetrafluoroethylene colloidally dispersed in an aqueous medium in high concentration.

Although many compounds having dicarboxylic acid structures have been found to be surface-active agents, they are not useful as such in the polymerization of tetrafluoroethylene to give aqueous dispersions of the polymer. The general class of surface-active agents has the effect of ether inhibiting the polymerization of tetrafluoroethylene or producing low molecular weight polymer which generally is not desirable. For these reasons only those surface-active agents which are extremely inert chemically can be used in the polymerization of tetrafluoroethylene to give aqueous dispersions of the polymer. Prior to this invention, it was believed that such structures should preferably be perfluorinated compounds. It is therefore very surprising that chlorendic acid, when used in small quantities, does not inhibit the polymerization of tetrafluoroethylene, nor cause the formation of low molecular weight polymer to any significant extent. High concentrations of this surface-active agent, in excess of 2% by weight of the water, however, should be avoided since the chlorendic acid has only a limited solubility in the aqueous medium. It has now been discovered that the surface activity of chlorendic acid is of such a character that only small quantities thereof, namely 0.01 to 1% by weight of the water, are necessary to prevent coagulation of the polymer.

This compound is economically prepared by a Diels-Alder addition reaction using hexachlorocyclopentadiene and maleic anhydride as described in greater detail in the Journal of the Am. Chem. Soc., vol. 69, pages 62–3 (1947). When used as a dispersing agent in the polymerization of fluoroethylenes, this compound may be employed in the acid form or in the form of the ammonium salt, although the acid form is preferred.

The conditions for carrying out the polymerization of fluorocarbon monomers in aqueous media, the specified initiator, the insoluble hydrocarbon, and the dispersing agent of this invention are in accordance with known procedures. The polymerization may be carried out batchwise or continuous at temperatures of 0 to 100° C. and pressures of 1 to 75 atmospheres are normally used, although for particular purposes temperatures and pressures outside of this range may be used. It is usually preferred to operate at temperatures of 50 to 95° C. and pressures of 5 to 40 atmospheres for obtaining optimum results.

The initiators generally employed for the polymerization of fluorocarbon monomers in this invention are water-soluble initiators such as peroxygen compounds, and preferably dibasic aliphatic peroxygen acids such as described in U. S. Patent 2,534,058, issued to M. M. Renfrew, December 12, 1950. Examples of these peroxygen compounds include disuccinic acid, peroxide, diglutaric acid peroxide, mono succinic acid peroxide, and the like. Other initiator systems, however, such as the iron bisulfite initiator system described in copending application of Adam E. Kroll, S. N. 354,651, filed May 12, 1953, may be employed with equal success. The initiator is generally employed in an amount of 0.005% to 0.5% by weight of the water.

The insoluble hydrocarbon is added to prevent excessive coagulation of the colloidal polymer in the dispersion, and is necessary when it is desirable to prepare concentrated polymer dispersions. Insoluble hydrocarbons used in the present invention are such saturated hydrocarbons as mineral oils and paraffins which have more than 12 carbon atoms, and which are liquid at polymerization temperatures. The quantity of this insoluble hydrocarbon should be sufficient to encase any coagulated polymer that is formed during polymerization, and thus stop further coagulation. Generally, a quantity of 1 to 5% on the basis of the aqueous medium is sufficient.

In many instances it will be desirable, although not necessary, to add from 5 to 10 parts per million by weight of the water of iron powder to the polymerization recipe. The powdered iron is used to increase the rate of polymerization.

The following examples are given to further illustrate the process of this invention and are not intended to limit the scope of the invention.

*Example 1.*—Into a stainless steel autoclave having a capacity of 3400 ml. were placed 1500 ml. of distilled water having therein dissolved 0.1% by weight of the water of disuccinic acid peroxide and 0.125% by weight of the water of chlorendic acid. To this solution 5 p. p. m. by weight of the water of fine iron powder and 100 ml. of "Kaydol," a commercially available mineral oil. The vessel was flushed with nitrogen, evacuated and pressured to 400 p. s. i. with tetrafluoroethylene, at which level the pressure was maintained throughout the reaction period. The reaction mixture was agitated for one hour at a temperature of 85° C. On releasing excess monomer the reaction mixture was removed from the autoclave. The colloidal dispersion of polytetrafluoroethylene was separated from the mineral oil and then filtered to remove coagulated polymer and the iron powder. The resulting aqueous polytetrafluoroethylene dispersion was found to have a solids concentration of 20%. The coagulum isolated was less than 2% of the polymer in the dispersion. The polymer obtained on coagulating the dispersion and drying the resulting powder could be compression molded into tough chips and after sintering at 380° C. were found to have densities of 2.22±0.01.

*Example 2.*—Into 3400 ml. stainless steel autoclave was placed 1500 ml. of water having therein dissolved 0.053% of ammonium perfluorocaprylate $$(F(CF_2)_7COONH_4)$$

0.215% of chlorendic acid and 0.1% of disuccinic acid peroxide based on the weight of the water. To this solution 5 p. p. m. by weight of the water of fine iron powder and 100 ml. of "Kaydol," a commercially avilable mineral oil, was added. The reaction vessel was flushed with nitrogen, evacuated and then pressured to 400 p. s. i. with tetrafluoroethylene, at which level the pressure was maintained throughout the reaction. The reaction mixture was agitated for a period of one hour at a temperature of 85° C. On releasing excess monomer the reaction mixture was removed from the autoclave. The colloidal dispersion of polytetrafluoroethylene obtained was separated from the mineral oil and then filtered to remove the coagulated polymer and the iron powder. The separated and filtered dispersion of polytetrafluoroethylene was found to have a solids concentration of 35%. The coagulum isolated was less than 1% of the dispersed polymer. Polytetrafluoroethylene obtained from coagulation of this dispersion could be compression molded at 380° C. into tough chips having a density of 2.22.

*Example 3.*—To test the stability of dispersions of polytetrafluoroethylene made by the process of this invention, a sample of the diluted dispersion containing 12% solids was placed into a stainless steel vessel and agitated by a paddle type mixer at the rate of 500 R. P. M. until coagulation occurred. The time for coagulation to occur was measured and compared with the time required to coagulate dispersions using preferred prior art dispersing agents as shown in the table below.

| Dispersing Agent | Original Conc. of the Disp. Agent Basis of Water Wt. in percent | Time of Agitation prior to Coagulation |
| --- | --- | --- |
| Chlorendic Acid | 0.5 | >15 min. |
| Ammonium Perfluorocaprylate | 0.5 | 5 min. |
| Mixture of Chlorendic Acid and Ammonium Perfluorocaprylate | 0.215 / 0.053 | 2 min. 10 sec. |

As can be seen from the recorded data, the stability of the dispersions toward coagulation by mechanical action made by the process of this invention is significantly increased over prior art dispersions. The dispersions are, however, easily coagulated after the addition of a base such as ammonium hydroxide and the like.

*Example 4.*—Into a 330 ml. stainless steel vessel was charged 125 ml. of water, 0.4 gram of chlorendic acid, 8.0 grams of "Kaydol," a commercially available mineral oil, 2.0 grams of ammonium persulfate and 60 grams of chlorotrifluoroethylene. The polymerization was allowed to proceed under autogenous pressure for 2 hours at 84 to 85° C. The reaction mixture was cooled to room temperature and excess monomer was removed. The mineral oil was separated from the reaction mixture. A colloidal dispersion of polychlorotrifluoroethylene containing 4% solid was obtained. The colloidal dispersion obtained was coagulated by agitating the dispersion and heating to 75° C. The solid dry polymer was compression molded into stiff films by heating to 260° C. for a period of 2 minutes under a pressure of 20,000 p. s. i.

*Example 5.*—Into a 330 ml. stainless steel vessel was charged 200 ml. of water, 1 gram of chlorendic acid imide and 0.2 gram of ammonium persulfate. The vessel was flushed with tetra-fluoroethylene, heated to 85° C. and pressured to 400 p. s. i. with tetrafluoroethylene. Maintaining the pressure at that level, the vessel was agitated for 35 minutes at 85° C. On cooling to room temperature, excess monomer was vented off. A collodial dispersion of polytetrafluoroethylene containing 14.3% solids was obtained.

*Example 6.*—Into a 330 ml. stainless steel vessel was charged 200 ml. of water, 1 gram of the sodium salt of chlorendic acid, 0.05 gram of sodium bisulfite, 0.1064 gram of sodium ferricitro phosphate. The vessel was flushed with tetra-fluoroethylene, heated to 60° C. and pressured to 400 p. s. i. with tetrafluoroethylene. Maintaining the pressure at that level, the vessel was agitated for 45 minutes at 60° C. On cooling to room temperature, excess monomer was removed. A colloidal dispersion of polytetrafluoroethylene containing 9.3% solids was obtained.

The process of the present invention is applicable to the polymerization of fluoroethylenes generally. By fluoroethylenes are meant ethylene compounds having at least 1 hydrogen substituted by a fluorine group. In addition to tetrafluoroethylene and chlorotrifluoroethylene, other fluoroethylenes such as vinylidene fluoride and vinyl fluoride may be employed. The present invention may also be used for the interpolymerization of fluoroethylenes with other ethylenically unsaturated monomers to form interpolymers of tetrafluoroethylene with ethylene, for example, or to form interpolymers with other fluoroethylenes such as chlorotrifluoroethylene, hexafluoropropylene, hexafluorobutadiene and the like.

The ratio of water to monomer in the practice of this invention is not critical, but merely a matter of choice depending on the size of the reaction vessel and the solids concentration of the polymer in the aqueous medium desired. Preferably aqueous dispersions having between 10 and 35% of collodial polymer are prepared. Higher solids concentrations may lead to the formation of coagulum during polymerization, but can be obtained after polymerization by concentration techniques known to those skilled in the art.

The dispersing agent used in the process of this invention may be used by itself or may be admixed with dispersion agents used in prior art processes in the polymerization of tetrafluoroethylene to give aqueous dispersions of polytetrafluoroethylene as shown by Example 2.

The advantages gained by using chlorendic acid as a dispersing agent in the polymerization of tetrafluoroethylene are the ease of preparing the dispersing agent, the small quantities of chlorendic acid necessary to achieve a stable aqueous dispersion of polytetrafluoroethylene and the improved handling properties of the dispersion.

The aqueous dispersions of fluorocarbon polymers obtained by the process of this invention have many valuable uses. They may be used as such for casting films, for coating and impregnating textiles, glass fabric, metal and wood. The dispersions may be concentrated or diluted by known methods to serve in particular applications, or the dispersions may be coagulated by extended agitation or by coagulating agents and the resulting polymer powder, upon drying, used in extrusion, molding, or otherwise fabricating into shaped articles.

We claim:

1. In the polymerization of fluoroethylenes in an aqueous medium to obtain a colloidal dispersion of polymer, the step of carrying out the said polymerization in the presence of a water-soluble polymerization initiator and a quantity of a compound of the class consisting of 1,4,5,6,7,7, - hexachlorobicyclo(2,2,1) - 5 - heptene 2,3-dicarboxylic acid and its acid salts not exceeding 1% by weight of said aqueous medium as the dispersing agent.

2. The process as set forth in claim 1 wherein the fluoroethylene is tetrafluoroethylene.

3. The process as set forth in claim 1 wherein the fluoroethylene is chlorotrifluoroethylene.

4. The process as set forth in claim 1 wherein the water-soluble polymerization initiator is disuccinic acid peroxide.

5. The process as set forth in claim 1 wherein the water-soluble polymerization initiator is ammonium persulfate.

6. The process as set forth in claim 1 wherein the dispersing agent is the imide 1,4,5,6,7,7-hexachlorobicyclo (2,2,1)-5-heptene 2,3-dicarboxylic acid.

7. The process as set forth in claim 1 wherein the dispersing agent is the sodium salt of 1,4,5,6,7,7,-hexachlorobicyclo(2,2,1)-5-heptene 2,3-dicarboxylic acid.

8. In the polymerization of tetrafluoroethylene in an aqueous medium to obtain a colloidal dispersion of polytetrafluoroethylene the step of carrying out the said polymerization in the presence of a water-soluble polymerization initiator, a quantity of 1 to 5% by weight of said aqueous medium of a saturated hydrocarbon, said hydrocarbon having a chain length of greater than 12 carbon atoms and being liquid at polymerization temperature, and a quantity of 1,4,5,6,7,7,-hexachlorobicyclo(2,2,1)-5-heptene 2,3-dicarboxylic acid not exceeding 1% by weight of said aqueous medium as a dispersing agent.

9. The process as set forth in claim 8 wherein the said polymerization is carried out in the presence of a quantity of finely divided iron not exceeding 100 p. p. m. by weight of the aqueous medium.

10. The process as set forth in claim 8 wherein the said water-soluble polymerization initiator is disuccinic acid peroxide.

References Cited in the file of this patent

UNITED STATES PATENTS

| 2,612,484 | Bankhoff | Sept. 30, 1952 |
| 2,662,065 | Berry | Dec. 8, 1953 |

OTHER REFERENCES

Robitschek et al.: Ind. Eng. Chem., volume 46, pages 1628–32, August 1954.